US009232769B1

(12) United States Patent
Wolf et al.

(10) Patent No.: US 9,232,769 B1
(45) Date of Patent: Jan. 12, 2016

(54) METHOD AND APPARATUS FOR AUTOMATICALLY DISPENSING WET PET FOOD

(71) Applicants: Alan Neil Wolf, New York, NY (US); Eric G. Lima, New York, NY (US)

(72) Inventors: Alan Neil Wolf, New York, NY (US); Eric G. Lima, New York, NY (US)

( * ) Notice: Subject to any disclaimer, the term of this patent is extended or adjusted under 35 U.S.C. 154(b) by 0 days.

(21) Appl. No.: 14/625,842

(22) Filed: Feb. 19, 2015

Related U.S. Application Data

(60) Provisional application No. 62/043,953, filed on Aug. 29, 2014.

(51) Int. Cl.
*A01K 5/02* (2006.01)

(52) U.S. Cl.
CPC ............... *A01K 5/02* (2013.01); *A01K 5/0291* (2013.01)

(58) Field of Classification Search
CPC ......... A01K 5/02; A01K 5/0291; A01K 5/00; B67B 7/38
USPC ................ 119/51.11, 51.12; 414/412; 83/614
See application file for complete search history.

(56) References Cited

U.S. PATENT DOCUMENTS

| | | | | |
|---|---|---|---|---|
| 2,728,983 A * | 1/1956 | Mugavero | ........................ | 30/418 |
| 3,080,078 A * | 3/1963 | Carew et al. | ................... | 414/412 |
| 3,853,620 A * | 12/1974 | Peres | ................................ | 134/6 |
| 3,874,341 A * | 4/1975 | Riba | ........................... | 119/51.12 |
| 3,982,501 A | 9/1976 | Marzocco | | |
| 4,044,722 A * | 8/1977 | Bradshaw | .................. | 119/51.13 |
| 4,077,360 A * | 3/1978 | Figlia | .......................... | 119/51.12 |
| 4,350,120 A | 9/1982 | Bittle | | |
| 4,421,059 A | 12/1983 | Cousino | | |
| 4,833,957 A * | 5/1989 | Lundgren | ................ | B26D 5/00 83/282 |
| 4,919,026 A * | 4/1990 | Julson, Jr. | .......... | A47G 27/0487 83/438 |
| 5,442,895 A * | 8/1995 | Linson | ......................... | 53/381.2 |
| 5,442,983 A * | 8/1995 | D'Angelo | ............. | B26D 1/045 83/208 |
| 5,806,278 A * | 9/1998 | Shelledy | ....................... | 53/381.1 |
| 6,427,628 B1 | 8/2002 | Reece | | |
| 7,395,640 B1 * | 7/2008 | Wang | ..................... | B26D 1/045 53/389.3 |
| 7,438,020 B2 * | 10/2008 | Palett et al. | ................ | 119/51.11 |
| 7,918,152 B2 * | 4/2011 | Tang | ...................... | B26D 1/045 242/554.2 |
| 8,857,301 B2 * | 10/2014 | Clark | ....................... | B26D 7/20 83/614 |
| 2001/0039866 A1 * | 11/2001 | Kohda | .................. | B26D 1/205 83/487 |
| 2002/0139230 A1 * | 10/2002 | Kojima | .................. | B26D 5/005 83/370 |
| 2003/0084766 A1 * | 5/2003 | Massaro | ............... | B23D 19/08 83/23 |

(Continued)

FOREIGN PATENT DOCUMENTS

| | | |
|---|---|---|
| WO | 00/74474 A1 | 12/2000 |
| WO | 2011/110822 A2 | 9/2011 |

*Primary Examiner* — Monica Williams
(74) *Attorney, Agent, or Firm* — Kane Kessler, P.C.; Barry E. Negrin

(57) ABSTRACT

An automatic wet pet food dispenser and method are provided. The dispenser includes a cutting surface onto which at least one sealed container of wet pet food is securable. A cutting blade is contactable with and movable with respect to the container placed on the cutting surface to thereby cut open the container. When the blade cuts open the container, the wet pet food inside the container falls out. A container shaking mechanism shakes the container to facilitate the wet pet food falling out of the cut open container without substantially moving the container from the cutting surface. A logic and timing module is provided to enable programming of the dispenser in advance, and a communication module is provided to enable the dispenser to receive commands remotely from a pet owner and send messages to the pet owner confirming successful food deployment and eating.

23 Claims, 14 Drawing Sheets

(56) References Cited

U.S. PATENT DOCUMENTS

| | | | |
|---|---|---|---|
| 2004/0216571 A1* | 11/2004 | Schultz | B23D 35/008 83/56 |
| 2005/0066905 A1 | 3/2005 | Morosin et al. | |
| 2006/0207515 A1* | 9/2006 | Palett et al. | 119/78 |
| 2008/0271582 A1* | 11/2008 | Chabansky | B26D 1/045 83/56 |
| 2009/0226236 A1* | 9/2009 | Yamashita | B26D 1/185 400/621 |
| 2010/0326252 A1* | 12/2010 | Benuzzi | B23D 45/105 83/422 |
| 2011/0174224 A1* | 7/2011 | Brooks | 119/57.92 |
| 2012/0060761 A1* | 3/2012 | Laro | 119/51.11 |
| 2013/0247829 A1 | 9/2013 | Taneja et al. | |
| 2015/0053138 A1* | 2/2015 | Ramsey et al. | 119/61.5 |

* cited by examiner

METHOD AND APPARATUS FOR AUTOMATICALLY DISPENSING WET PET FOOD

RELATED APPLICATIONS

Priority is claimed from U.S. Provisional Patent Application No. 62/043,953 filed Aug. 29, 2014 and entitled "Automatic Wet Pet Food Dispenser", the teachings of which are fully incorporated by reference herein.

BACKGROUND OF THE INVENTION

1. Field of the Invention

The present invention is directed to pet feeding devices. More specifically, the invention is directed to an automatic wet pet food dispenser which holds one or more sealed containers such as pouches of wet pet food. At selectable times or intervals, the device automatically cuts open each pouch and provides the wet food to the pet.

2. Description of the Related Art

Pet ownership has grown dramatically in recent decades. By 2012, 62% of American households included at least one pet (including 90 million cats and 80 million dogs). American pet owners spend over $20 billion annually to feed their pets, and over $4 billion annually to board their pets when they travel.

To care for his or her pet an owner must daily provide fresh drinking water, an adequate quantity of palatable food, and an opportunity for the animal to excrete—a clean litter box for a cat, multiple 'walks' each day for a dog. Owners generally integrate these obligations into their daily routines, e.g., feeding the pet each morning before the owner leaves for work or school and cleaning a litter box each evening, but sometimes these tasks are difficult to execute, e.g., when all members of the household are traveling for an afternoon or a weekend.

To address a pet's bodily needs when the owner is traveling, owners employ a diverse variety of strategies. Some owners travel with their pets. Other owners ask neighbors or professional "pet sitters" to care for their pets in the owner's home. Still other owners "board" their pets at animal "day care" facilities. In the case of cats, which do not require walks, each of the animal's bodily needs may be met by a separate automated device—an electric watering fountain, an automated dry food dispenser, and a self-cleaning litter box. Each of these approaches to caring for a pet when the owner is traveling has a number of advantages and disadvantages. Some of these strategies are expensive, some are unreliable, and some may unduly distress a pet already stressed by the owner's absence.

One source of stress, particularly for cats, is that their usual diet may consist of wet cat food, which typically comes in cans or vacuum-sealed pouches. Commercially available automated pet food dispensers invariably dispense dry food.

In U.S. Pat. No. 4,421,059, Grant teaches a cat feeder that has a plurality of spaced feed positions, and a top containing a feeding opening. The feeding opening is indexed sequentially with respect to the successive feed positions. A pair of tension springs are wound and rotate the cover upon release by a time-actuated solenoid. This invention is adequate to dispense dry pet food, and a number of products of similar design are commercially available to pet owners. Such devices can only be used with dry food, as wet food, once exposed to the air, rapidly spoils without refrigeration. A few commercial devices similar to the Grant patent purport to work for wet food, as they add a cavity under each feed position in which a small frozen ice pack may be placed. Such devices, even in principle, cannot preserve wet cat food for more than a few hours. Such ice packs rapidly melt and provide no protection against food spoilage. Even in the short term, when the ice pack is still cold, experience with such feeders shows that cats frequently reject wet food whose underside is colder than room temperature and whose top side is beginning to spoil.

A few devices attempt to meet the need for a safe wet pet food dispenser. U.S. Patent Application Publication No. 2013/0247829 to Taneja shows an elaborate system comprising a robotic arm and a conventional electric can opener that removes the lid of a cylindrical, hermetically sealed rigid can of wet pet food, transports the can to a location above a nearby food bowl, inverts the can, and finally shakes the can to dispense its contents. This device is too large and complex for reliable home use and risks injuring the pet which may get entangled in the device's moving parts. In U.S. Pat. No. 4,077,360, Figlia shows a wet pet food dispenser that incorporates a conventional can opening mechanism for removing the lid of a cylindrical, hermetically sealed rigid can of wet pet food. This device risks injury to the pet's tongue or mouth by presenting the opened can with sharp edges rather than dispensing the can's contents into a conventional cat food bowl.

Thus, there is a long-felt need to provide a method of and device for dispensing wet pet food in a manner that does not require the pet owner to be present for every feeding, and in a manner that a pet owner is provided with confirmation of preferably both delivery of wet food to the pet and eating of the food by the pet.

SUMMARY OF THE INVENTION

The above and other needs are met by the invention, which is a method of automatically feeding wet food to a pet. A pre-measured quantity of wet pet food in a sealed container (e.g., a "pouch") is provided. The pouch is placed in a fixed location on a cutting surface in a wet food dispenser above a food receptacle (which for purposes of this disclosure can include an integral or separate bowl or tray, the floor, or any other concave or substantially flat structure adapted to receive food). The pouch is automatically cut open at least partially. The pet food in the pouch is allowed to fall into the food receptacle via gravity.

Preferably, the pouch is shaken after the automatic cutting step to facilitate the allowing-to-fall step. Optionally, the shaking step includes the step of imparting periodic movement to the pouch while the pouch is in the fixed location on the cutting surface via a shaking mechanism. Periodic movement may be imparted by a tapping mechanism or a vibrational mechanism, or both. In addition or in the alternative, the shaking step may optionally include the step of encouraging the pet to play with, and in effect to shake, the newly opened pouch. This may be accomplished by providing a pet toy integral with the pet food dispenser adapted to attract the pet's attention. Preferably, the pet toy is provided after the cutting step.

The inventive method preferably further includes the step of receiving an instruction to initiate the cutting step at a predeterminable time. The receiving step may further include the step of receiving an instruction remotely from a pet owner's communication device, such as a computer, cell phone, smartwatch, or similar personal electronic device (PED). The receiving step may further include the steps of: entering a predetermined feeding time on a user interface; and storing the predetermined feeding time in a memory.

In the inventive method, the cutting step preferably includes the step of moving a cutting blade across a portion of the pouch, e.g., a tearing edge of the pouch. Preferably, the moving step further includes the steps of: providing a motor and mechanical linkage between the motor and the cutting blade; and actuating the motor.

The inventive method may optionally include the step of, after the cutting step, detecting the presence of wet food from the opened pouch in/on the food receptacle. The detecting step may further include the step of detecting at least one of i) the weight of the food in/on the receptacle, or ii) the moisture of the food in/on the receptacle. Upon detecting food in/on the receptacle, the method may also include the step of sending a first message to the pet owner corresponding to the food detected in the detecting step, e.g., to the pet owner's communication device such as a computer, cell phone, smartwatch, or other PED.

Optionally, the method further includes the steps of: detecting that food has been substantially eaten from the food receptacle; and sending a second message to the pet owner corresponding to the eating of the food from the receptacle.

Any combination or permutation of the above-described steps is contemplated as forming a part or embodiment of the invention.

The invention also includes an automatic wet pet food dispenser. The dispenser includes a cutting surface onto which at least one sealed container (e.g., a pouch) of wet pet food is fixedly placeable. A movable cutting blade is selectively contactable with and movable with respect to the pouch placed on the cutting surface to thereby cut open the pouch at least partially. When the cutting blade at least partially cuts open the pouch, the wet pet food inside the pouch substantially falls out of the pouch. The dispenser preferably includes a base on which the cutting surface is formed and at least one food receptacle disposed below the cutting surface adapted to receive the wet pet food substantially falling out of the container/pouch when the cutting blade at least partially cuts open the pouch.

Optionally, the dispenser includes a container/pouch-shaking mechanism associated with the cutting surface and contactable with the pouch fixedly placed thereon. The pouch-shaking mechanism is adapted to shake the fixedly placed pouch to facilitate the wet pet food falling out of the pouch without substantially moving the fixedly placed pouch from the cutting surface. In one embodiment, the pouch-shaking mechanism includes a vibrating mechanism to vibrate the fixedly placed pouch. In addition or in the alternative, the pouch-shaking mechanism includes a tapping mechanism reciprocatable into and out of the cutting surface to tap the fixedly placed pouch periodically. Instead of an integral shaking mechanism, the dispenser optionally may include a pet toy adapted to attract a pet's attention after the fixedly placed pouch is at least partially cut open that encourages the pet to strike the pouch and thereby shake the food out of the cut pouch.

The movable cutting blade of the invention may be provided with a shield placeable in front of the cutting blade to prevent a pet from contacting the cutting blade. The movable cutting blade may further include a linkage that drags the movable cutting blade across a lower region of the fixedly placed pouch to form a cut substantially across the pouch. In addition or in the alternative, the movable cutting blade of the invention may be substantially U-shaped and mounted on a roller that rolls over and presses down on the container/pouch to thereby form a substantially U-shaped cut in the pouch.

The inventive wet pet food dispenser preferably includes a motor for moving the movable cutting blade; a user interface adapted to receive instructions from a user to program operation of the motor; and a microcontroller, in communication with the user interface and the motor, adapted to receive the instructions from the user interface and transmit the instructions to the motor. Preferably, memory is also provided in communication with the microcontroller for storing the instructions. The user interface may include at least one of a key pad, a touch screen, or a remote communication module. A communication module is preferably provided, in communication with the microcontroller, adapted to at least one of (and preferably both) send messages to, and receive messages from, a user's remote communication device.

Additionally, at least one food sensor is preferably provided in communication with the microcontroller adapted to detect the presence of wet pet food in the food receptacle. The at least one food sensor includes at least one of an accelerometer, a strain gauge, or a moisture sensor. Other sensors, such as a photoelectric sensor, a weight sensor (i.e., a scale), and others, are also contemplated.

The invention is an automatic wet pet food dispenser which holds one or more sealed containers/pouches of wet pet food, and at specific timed intervals over a period that will typically span a few days, cuts or severs the bottom edge of each pouch in turn. Through the combined effects of gravity and optionally an electro-mechanical vibrator/shaker, the device causes the contents of the pouch to fall into a receptacle such as an integral or separate food bowl, tray, or the like.

The present invention dispenses pet food from commercially available pet food pouches, marketed by, e.g., Friskies®, Whiskas®, and Wellness®. The pouches themselves vary somewhat in composition, but are generally described as food grade laminated aluminum pouches. Being hermetically sealed, these packages do not require refrigeration to preserve the pet food contained within, e.g., "Salmon in gravy."

Such pouches are most often rectangular in shape, and typical dimensions are approximately 4 inches by 5 inches. A notch near one end of a long edge of the pouch indicates that the user should open the pouch by tearing off one of the short (4 inch) edges, starting at the notch. This short edge will be referred to as the tearing edge. The short edge at the opposite end of the pouch, which will be referred to as the bulging edge, is located near a fold in the pouch which permits that section of the pouch to bulge and hence a substantial portion of the solid and liquid food is often found towards this end.

The food contained within different varieties and brands of pouches varies a great deal in consistency and liquidity ('soupiness')—but in each case, if a pet owner rips off the tearing edge of the pouch by hand, inverts the pouch, and holds and/or shakes the pouch, the contents of the pouch will fall into a waiting food bowl below. The present invention automates the tearing and shaking of an inverted pouch, i.e., it feeds the pet without requiring the presence of a human actor.

Several preferred embodiments of the invention will be described in detail infra, including several 'linear' versions and a 'rotary' version. The linear embodiments share a number of fundamental design principles. In several of the linear embodiments, the user will secure one or more food pouches to the device in a substantially inverted position, i.e., with the tearing edge closer to the floor. The food pouches will be held in place by, e.g., a spring-loaded clip or a captive screw-tensioned bar at the bulging end of the pouch. In each of these embodiments, at times selected by the user, a sharp blade, driven by a motorized belt-drive assembly, will be dragged across the tearing edge of a pouch, completely severing a section of the tearing edge (e.g., the bottom ½" of foil) from the rest of the pouch, thus permitting the contents of the pouch to fall down towards a feeding bowl (a "trough" or "food receptacle"). In the alternative, another preferred embodiment secures the pouch "right-side up", i.e., with the tearing edge closer to the ceiling. The cutting surface is angled at an acute or right angle (90° or fewer) to the floor, so that when the blade severs the tearing edge of the pouch, the pouch flops downwardly and the contents spill out.

Some varieties of pet food are composed of relatively small food particles in watery gravy, and for these varieties, gravity would be a sufficient inducement for food to rapidly fall from the pouch into the trough. For other, less soupy varieties, it may be necessary to shake the pouch. Therefore, regardless of the consistency or liquidity of the food, the present invention may include an electromechanical vibrator which will shake the pouch at a frequency and amplitude that will speed delivery of food to the hungry pet. Our experimental work suggests that a frequency in the range of several Hz to a few hundred Hz, inducing roughly 2 mm of displacement of pouch surface, is effective at speeding the dispensing of the chunkiest and driest varieties of food, although other frequencies and amplitudes may be equally or more effective.

The linear and rotary embodiments of the invention disclosed herein differ in one fundamental aspect. In the linear embodiment of the invention, pouches are lined up in a row along one flat and predominantly vertical face (the "front wall") of the device, so the cutting blade will travel in a straight line as it severs consecutive pouches. In the rotary embodiment of the invention, pouches are disposed on the outer face of a cylindrical and predominantly vertical wall, so the cutting blade will travel in a circle as it severs consecutive pouches.

Linear and rotary embodiments are both described, yet any convenient geometry may be employed. The invention only requires flexible and preferably disposable food containers such as pouches secured against a cutting surface, and a cutting element suitable for cutting into a sealed food container (e.g., a fixed blade or a rotary 'pizza cutter' type blade). Optionally, a mechanical shaker/vibrator is provided to speed the evacuation of food from the container.

DETAILED DESCRIPTION OF THE INVENTION AND DRAWINGS

Description of the invention will now be given with reference to the attached FIGS. 1-14. It should be understood that these figures are exemplary in nature and in no way serve to limit the scope of the invention, which is defined by the claims appearing hereinbelow.

Figure 1:
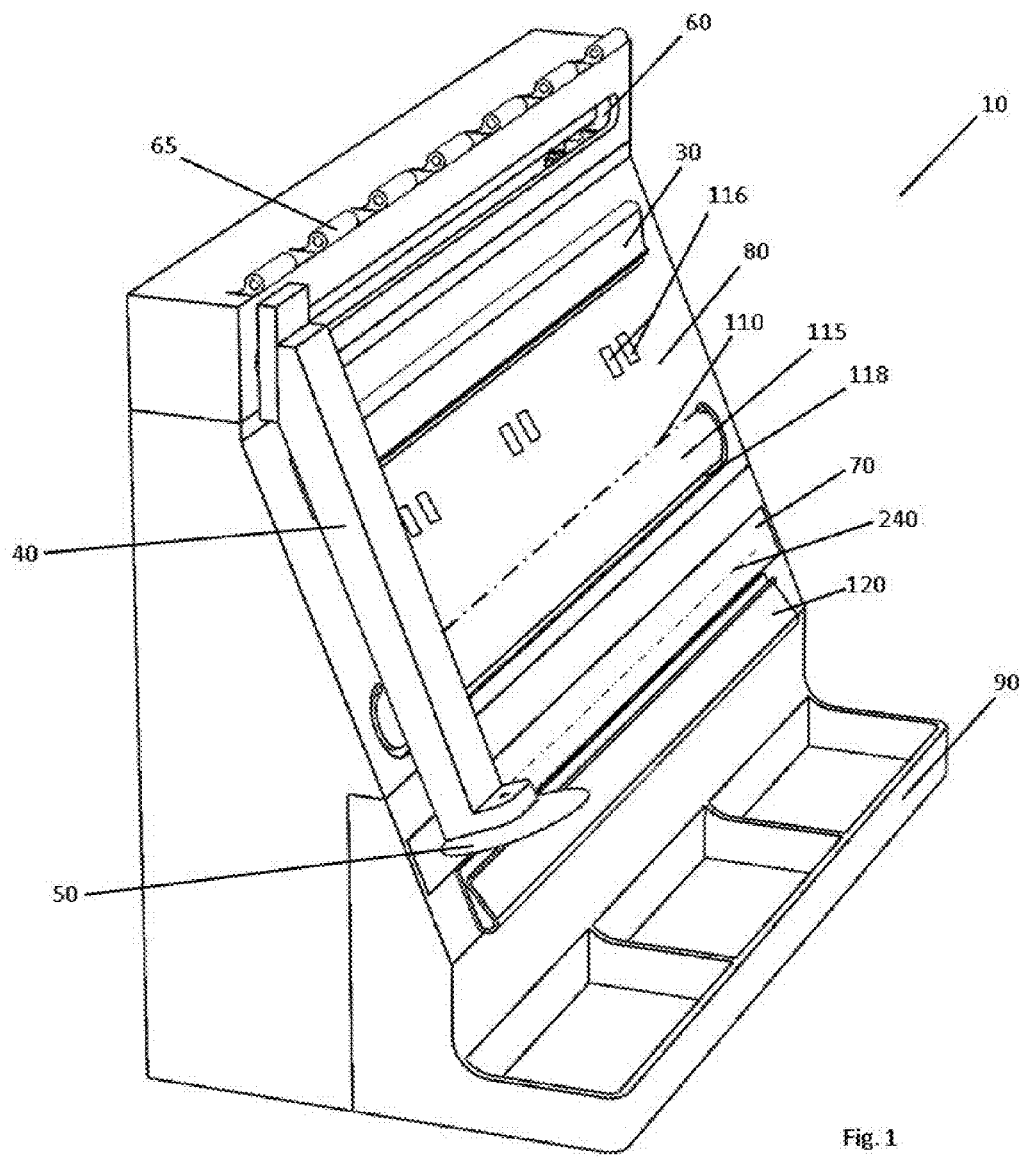
FIG. 1 is a perspective view of a linear embodiment of an automatic wet pet food dispenser in accordance with the invention, before food pouches have been fastened to the device.
Figure 2:
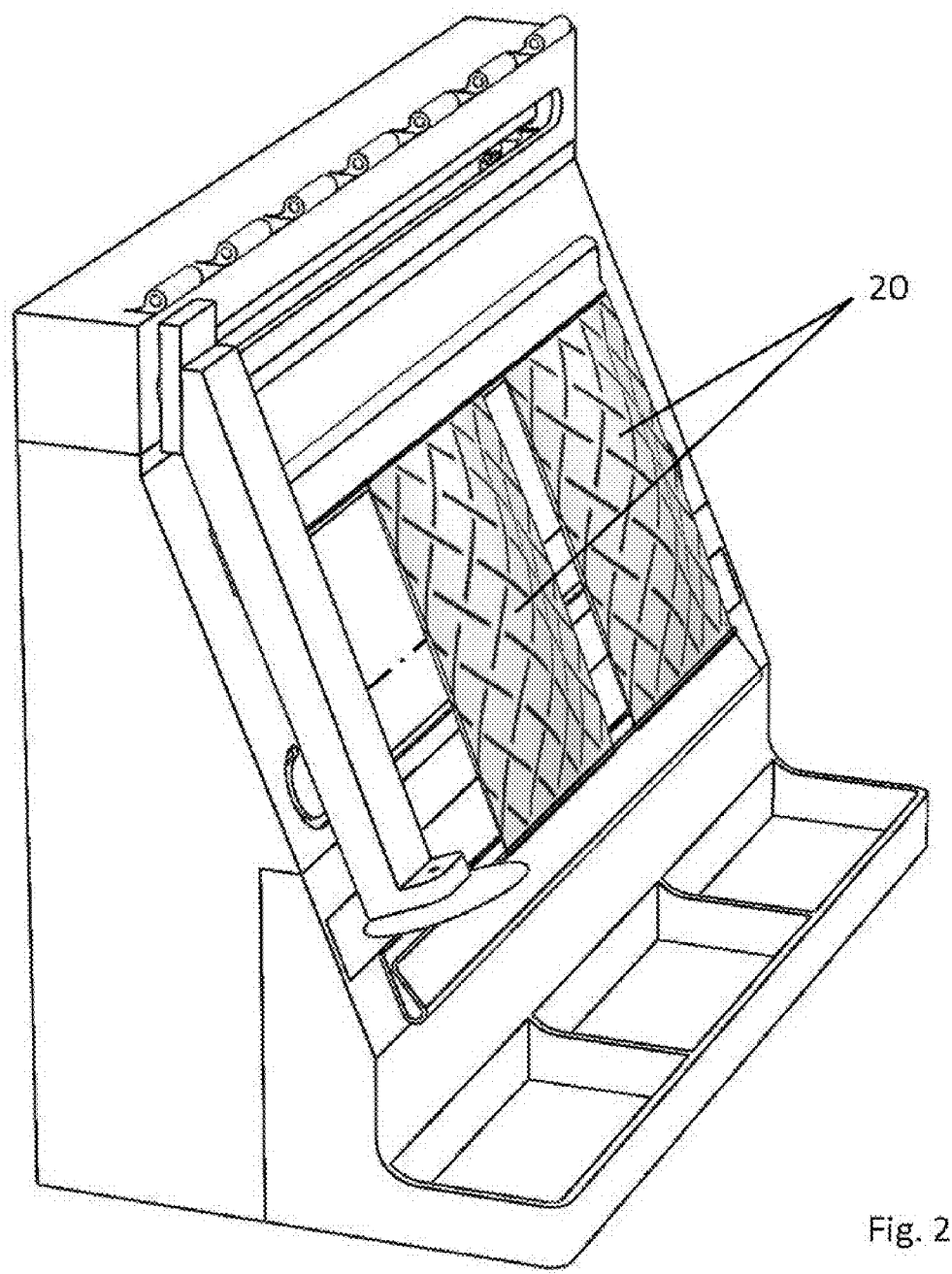
FIG. 2 is a perspective view of the first linear embodiment of an automatic wet pet food dispenser in accordance with the invention, after two food pouches have been secured to upper and lower clips on the device.

FIGS. 1 and 2 show a linear embodiment of an automatic wet pet food dispenser 10, respectively, before and after a number of flexible food containers such as food pouches 20 have been secured to the device in an inverted position (i.e., with the pouch edge to be severed closest to the floor) by upper clip 30, which may be, e.g., a spring-loaded clip, a captive screw-tensioned bar, or a slot cut in front wall 80, tapered in the direction of travel of arm 40. One flat side of each pouch will rest on front wall 80 which, consistent with the largely gravity-driven manner in which food will ultimately be dispensed, is substantially vertically oriented. As a matter of terminology, the side of the pouch that rests on front wall 80 will be said to face "inward."

Figure 6:
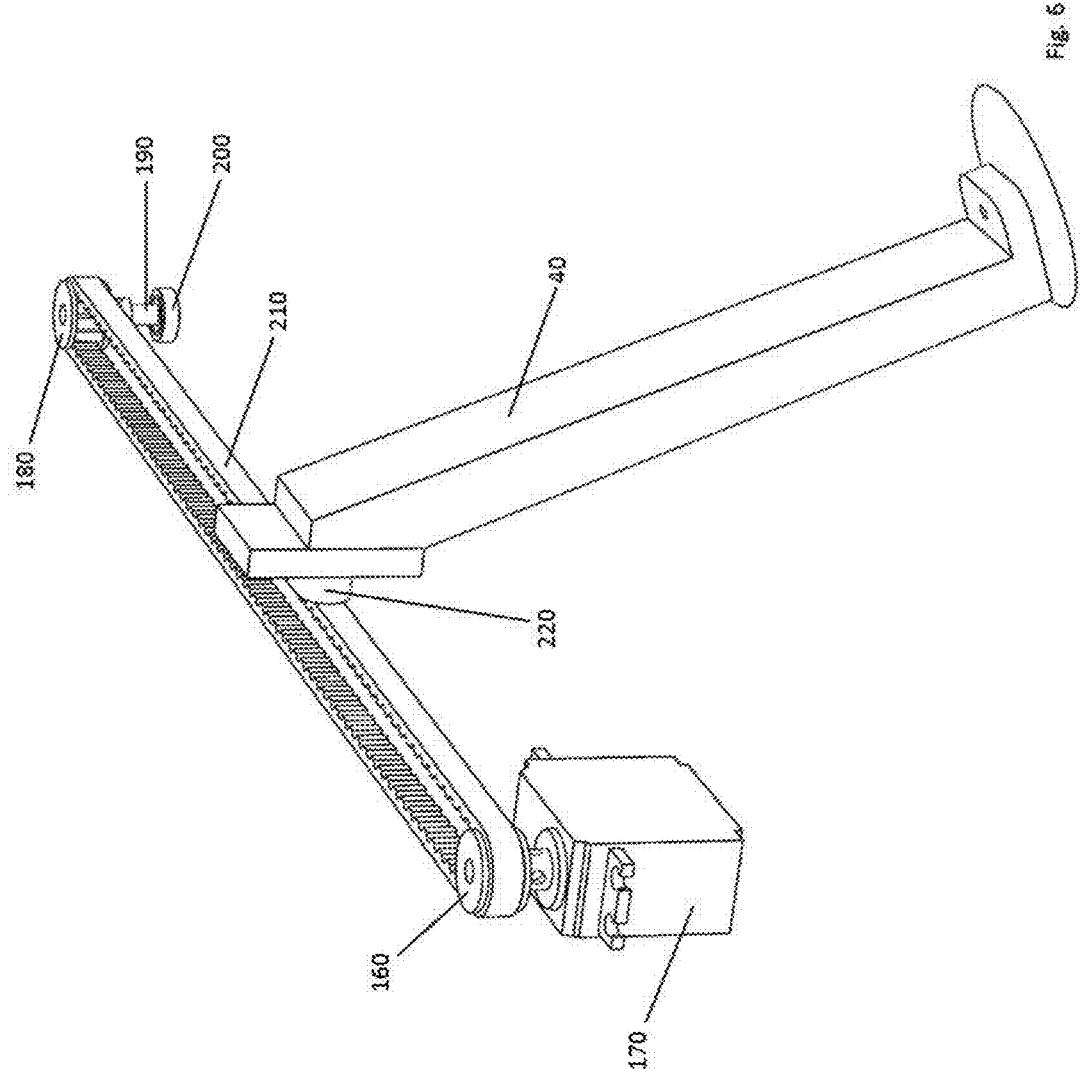
FIG. 6 is a perspective view of the belt-drive assembly that drives the cutting arm in the first linear embodiment of an automatic wet pet food dispenser in accordance with the invention.
Figure 7:
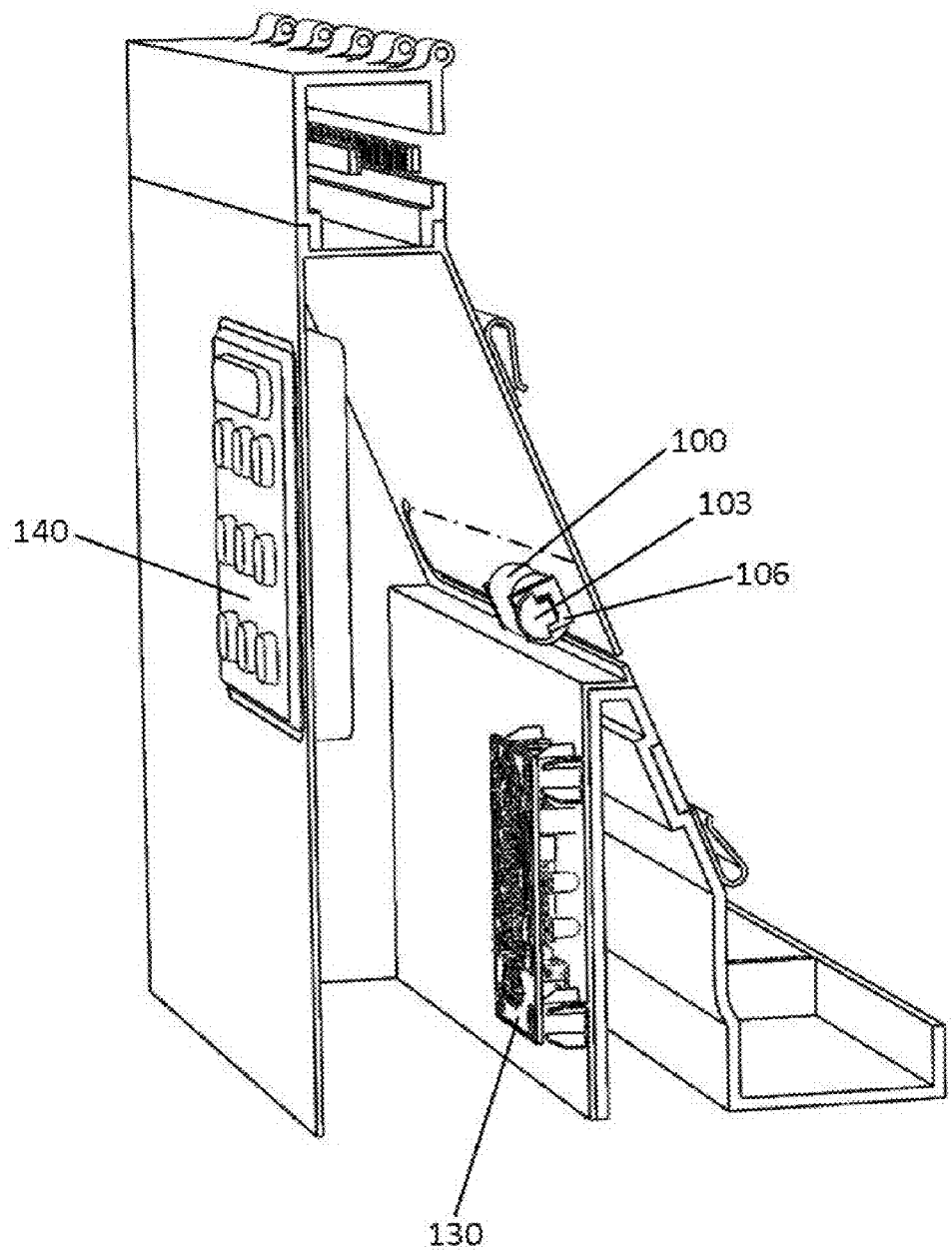
FIG. 7 is a rear perspective cut-away view of the first linear embodiment of an automatic wet pet food dispenser in accordance with the invention highlighting the user controls, the logic/timing module, and the electromechanical vibrator.

Directing attention to FIG. 6, connector 220, which passes through channel 60 (see FIG. 1), connects cutting arm 40 to a belt-drive assembly. The belt-drive assembly includes a first timing-belt pulley 160 attached to the shaft of DC servo motor 170, a second timing-belt pulley 180 attached to shaft 190, which is press-fit into rotary bearing 200, and timing belt 210, which is stretched across the two timing belt pulleys. The belt-drive assembly induces arm 40 to travel parallel to front wall 80 which causes blade 50 to sever an edge of one or more food pouches. The motion of the drive-belt assembly is controlled by logic/timing module 130 (described below), which has been programmed by user controls 140 or via remote control (described below) to move fixed distances at fixed times e.g., to move one pouch width each X (e.g., 12) hours, after an initial delay of Y (e.g., 4) hours, or to move at one or more predetermined specific times, or the like.

Blade 50 is shown in our figures as a rotating, pizza-type cutter, but alternatively the blade may be a simple fixed blade, similar to a scalpel or a mat knife blade. Cutting arm 40 is disposed so that blade 50 will be moved along the outer facing side of pouches 20 at an appropriate height to insure that, once the pouch edge is severed, a majority of the contents of the pouch will be free to fall from the pouch. Further, cutting arm 40 is disposed so that blade 50 will exert sufficient inward force on the laminated aluminum pouch to sever the edge of the pouch closest to the floor.

Cutting surface 70 is located directly beneath the line of action of blade 50. The cutting surface is composed of a resilient material, such as urethane or polyurethane rubber that will tend to keep the blade sharper than if the underlying surface was a rigid material, such as a dense plastic. Further, the use of a "self-healing" material such as urethane as a substrate will prevent the blade from creating plastic dust or shavings that might fall into the pet's food. In order to insure that sufficient force is exerted by blade 50 on pouch 20 to sever the pouch's edge, cutting arm 40 will be disposed so that the cutting edge of blade 50 will travel within groove 240 of cutting surface 70, at a depth sufficient to overcome compliance (e.g., bending of arm 40, flexing of pouch 20, or flexing at connector 220) which might interfere with the cutting operation.

After a number of uses, blade 50 will likely require replacement or sharpening. It will be readily apparent to one of ordinary skill in the mechanical arts how a dull blade, whether fixed or rotating, might be replaced by a fresh blade.

Figure 4:
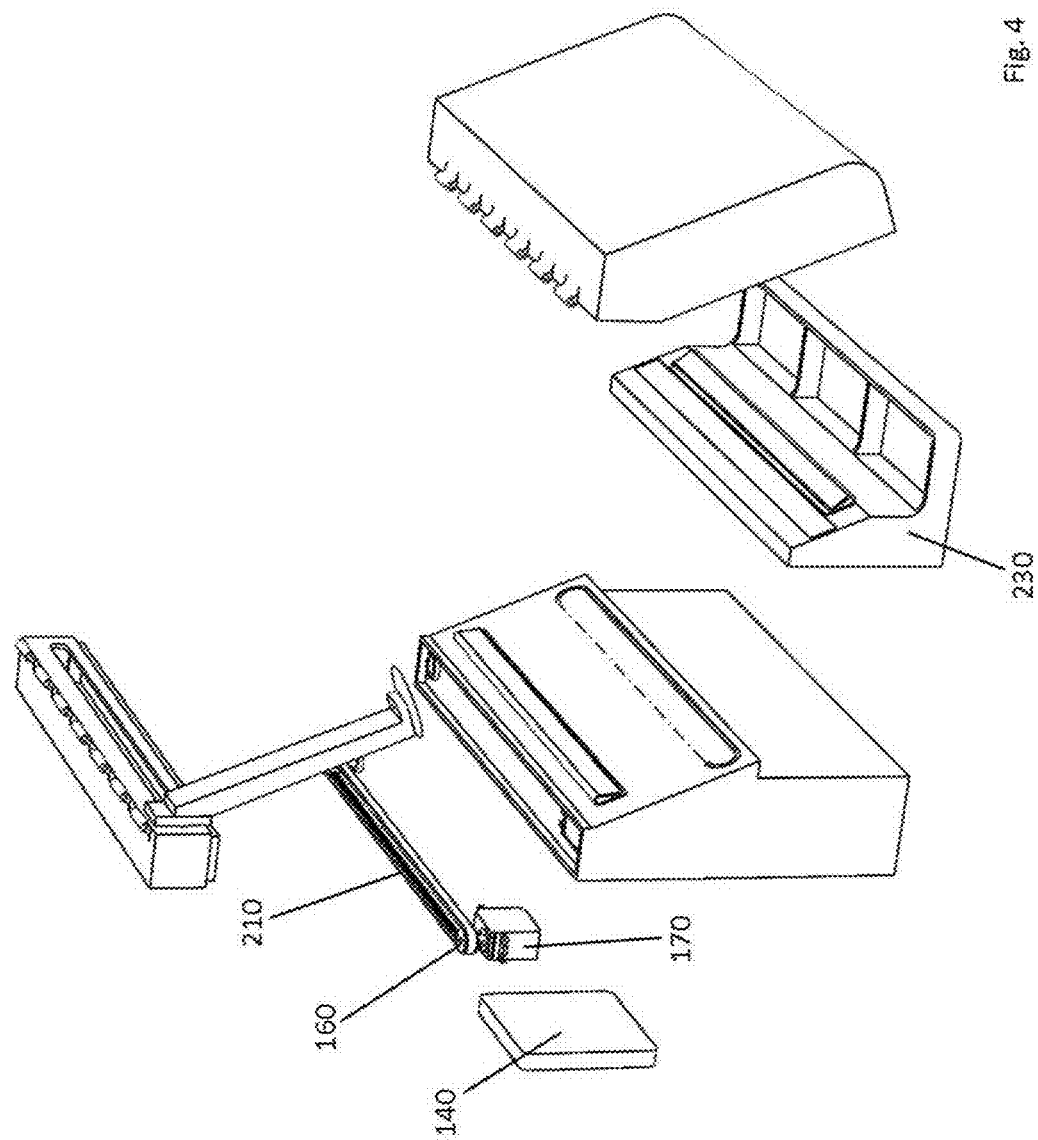
FIG. 4 is an exploded front perspective view of the first linear embodiment of an automatic wet pet food dispenser in accordance with the invention, highlighting various sub-assemblies of the device.
Figure 5:
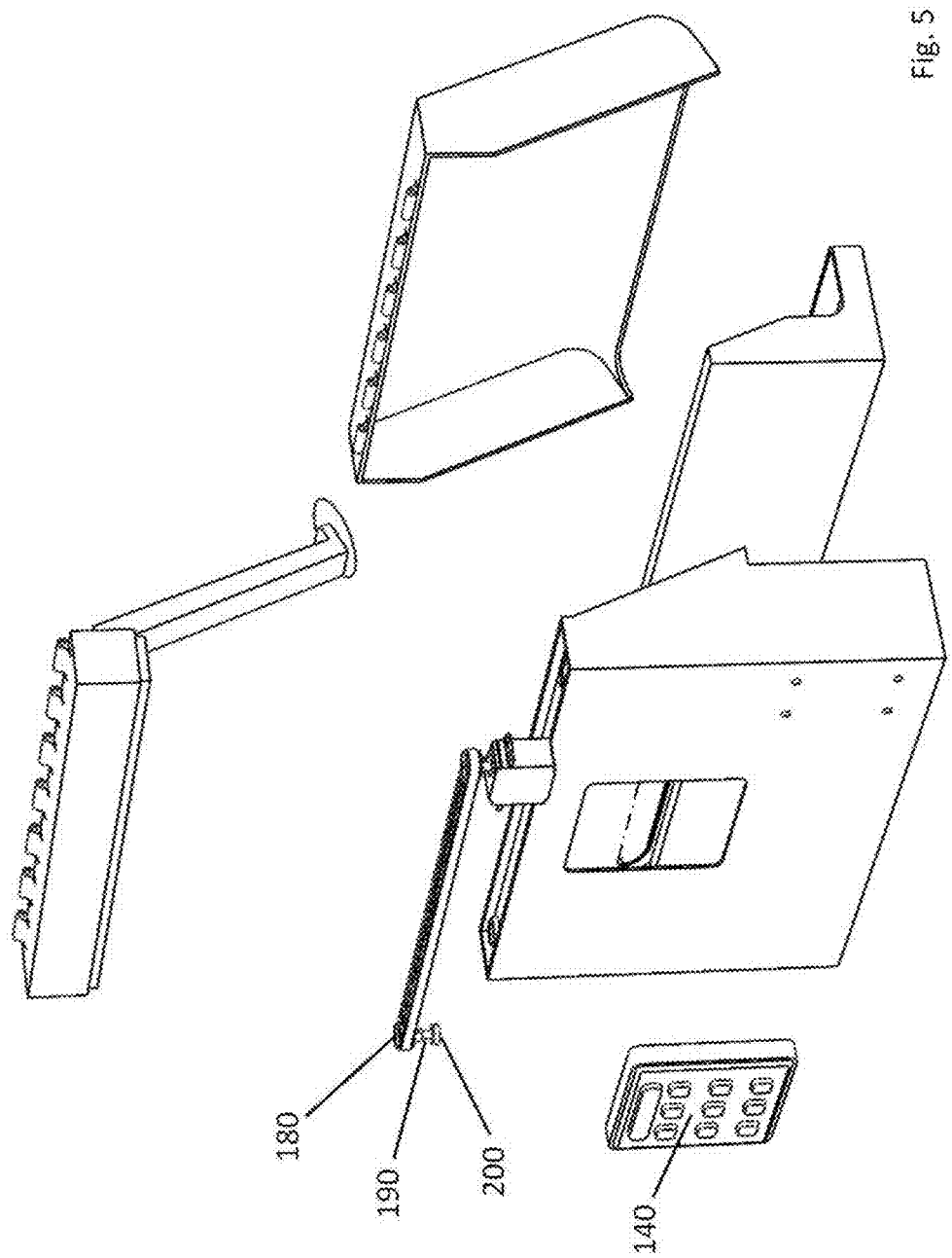
FIG. 5 is an exploded rear perspective view of the first linear embodiment of an automatic wet pet food dispenser in accordance with the invention.

Once the tearing edge of a food pouch has been severed by blade 50, food will tend to fall into trough 90. In FIGS. 1 and 2, trough 90 is shown as a partitioned receptacle with one partition for each food pouch, serving the function of separating freshly dispensed food from mixing with food from a previous feeding. However, the trough might equally well be a single, unpartitioned receptacle. The user may also wish to use the pet's own food bowl if appropriately sized and shaped, or a tray, or the floor, or any structure that is adapted to receive food (e.g., overall concave or overall substantially flat). FIG. 4 shows a washable assembly 230, which comprises trough 90, cutting surface 70, and lower clip 120. This assembly, which fits underneath the lip of front wall 80, facilitates the easy cleaning of the trough and nearby components, which may collect food debris.

As previously noted, not all varieties of food will fall into trough 90 from gravity alone. To induce less soupy varieties of food to exit a pouch, a shaking mechanism is preferably provided. In one embodiment, the shaking mechanism includes a vibrator assembly, consisting of vibrator motor 100, eccentrically mounted cam 103, and motor mount 106 will cause flap 115 on front wall 80 to vibrate (see FIGS. 7 and 1). This motion will in turn cause pouch 20 to vibrate with an appropriate amplitude and frequency to increase the rate of discharge of food from the pouch. As an alternative to a motor with an eccentric cam, the vibrator assembly may comprise, e.g., a piezoelectric element to which an appropriate time-varying voltage is applied. The vibrator assembly is mounted on flap 115, which is free to flex due to cut 118 and score line 110. In another embodiment, a tapping/poking mechanism 116 (see FIG. 1) may be provided integral with and periodically poking in and out of the plane of front wall 80 to poke or tap pouch 20 affixed thereon. The tapping/poking mechanism shown in FIG. 1 includes two prongs per pouch area, however any convenient number of prongs in any arrangement may be provided.

Figure 3:
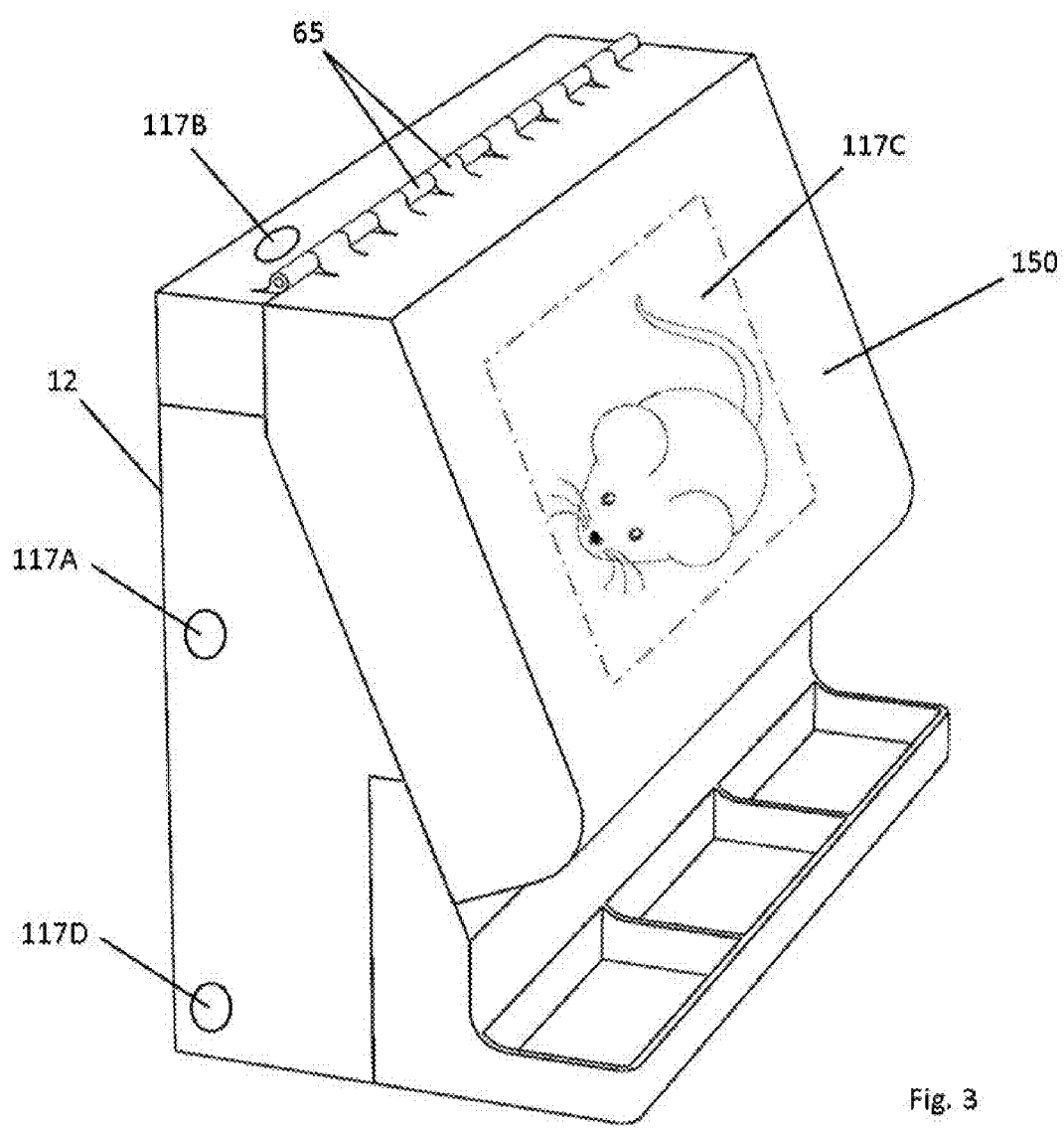
FIG. 3 is a perspective view of the first linear embodiment of an automatic wet pet food dispenser in accordance with the invention, illustrating a cover that will prevent the pet from interfering with moving parts in the device or being injured by contact with the blade.

In addition or in the alternative, the device may be provided with one or more pet toys to encourage the pet to bat or smack the cut-open pouch and facilitate the evacuation of food from the pouch (or, at the very least, attract the pet's attention to get it to come over and eat the food). As shown in FIG. 3, pet toys 117A-D are provided in various locations around the device; these locations are not critical, and indeed, a pet toy such as these may be disposed anywhere convenient on the device. In any case, some of the envisioned pet toys include: a string 117A that pops out of base 12 to attract the attention of the pet (optionally retractable after a predetermined time period); a jack-in-the-box-type pop-up toy that deploys from a gate 117B; an image 117C projected onto cover 150; and/or a sound played via speaker 117D (e.g., a stored digital recording of the pet owner's voice calling the pet by name). Any or all of these may be used together in any combination or permutation, even on a rotating basis to keep the pet interested. In operation, the food pouch would be cut open, and during or immediately after the cutting step, one or more pet toys 117A-D (or the like) would deploy to attract the pet's attention and encourage the pet to thwack pouch 20.

Regarding the cutting procedure described thus far, if the tearing edge of a pouch has been completely severed by blade 50, the tearing edge will tend to fall into trough 90, along with the pet's food. This is likely not a problem, as most pets will not attempt to ingest a 4-inch long strip of laminated aluminum, even if covered with a small amount of food and gravy. Further the aluminized pouch presents no sharp edges that might injure the pet's mouth or tongue. However, since it is desirable to keep foreign objects out of the trough, lower clip 120 may be situated on front wall 80, below cutting surface 70. Lower clip 120 may be a spring-loaded or other clip that secures all of the pouches resting on front wall 80. A further advantage of adding lower clip 120, particularly a captive screw-tensioned bar, is that each food pouch will be secured at two locations (by clips 30 and 120), which will reduce the tendency of pouches to move away from the approaching blade. If clip 120 is employed, the severed edge of a food pouch will sit in the path of exiting food. To prevent a blockage of exiting food, clip 120 will have a low profile relative to front wall 80. Additionally, either vibrator 100 or pokers 116 will cause the open end of the pouch to oscillate away from front wall 80, lifting the pouch so that exiting food does not encounter the protrusion.

In addition or in the alternative, to prevent any portion of the pouch from falling into the trough, the cutting movement of blade 50 can be delimited to cut only partially across a pouch, either starting from one end and being lifted up prior to reaching the other end, or beginning cutting inwardly of a leading edge of a pouch and ceasing cutting prior to reaching a trailing edge of the pouch.

Figure 12:
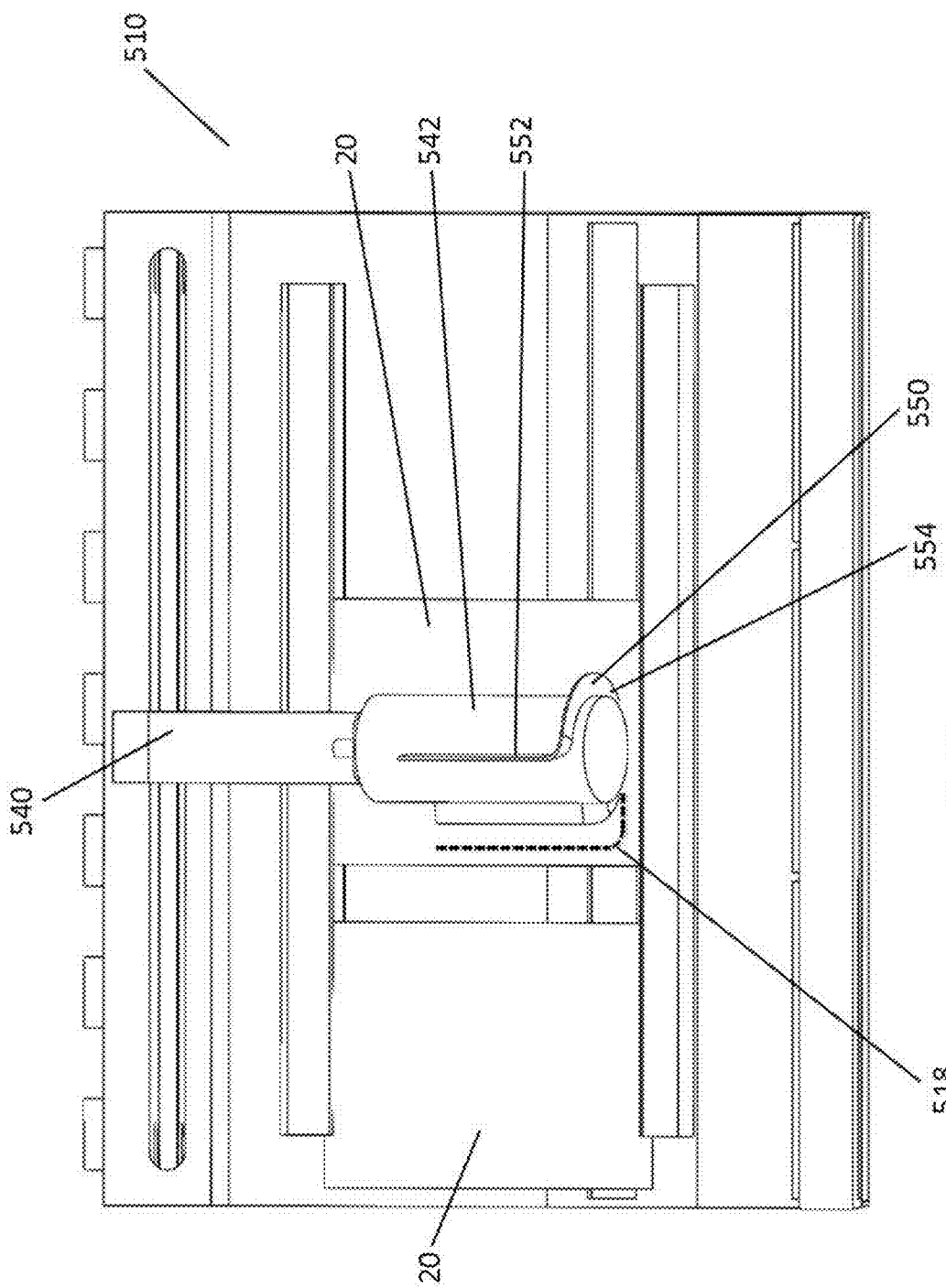
FIG. 12 is a front view of a second linear embodiment of an automatic wet pet food dispenser in accordance with the invention, employing a rotary die cutting blade.
Figure 13:
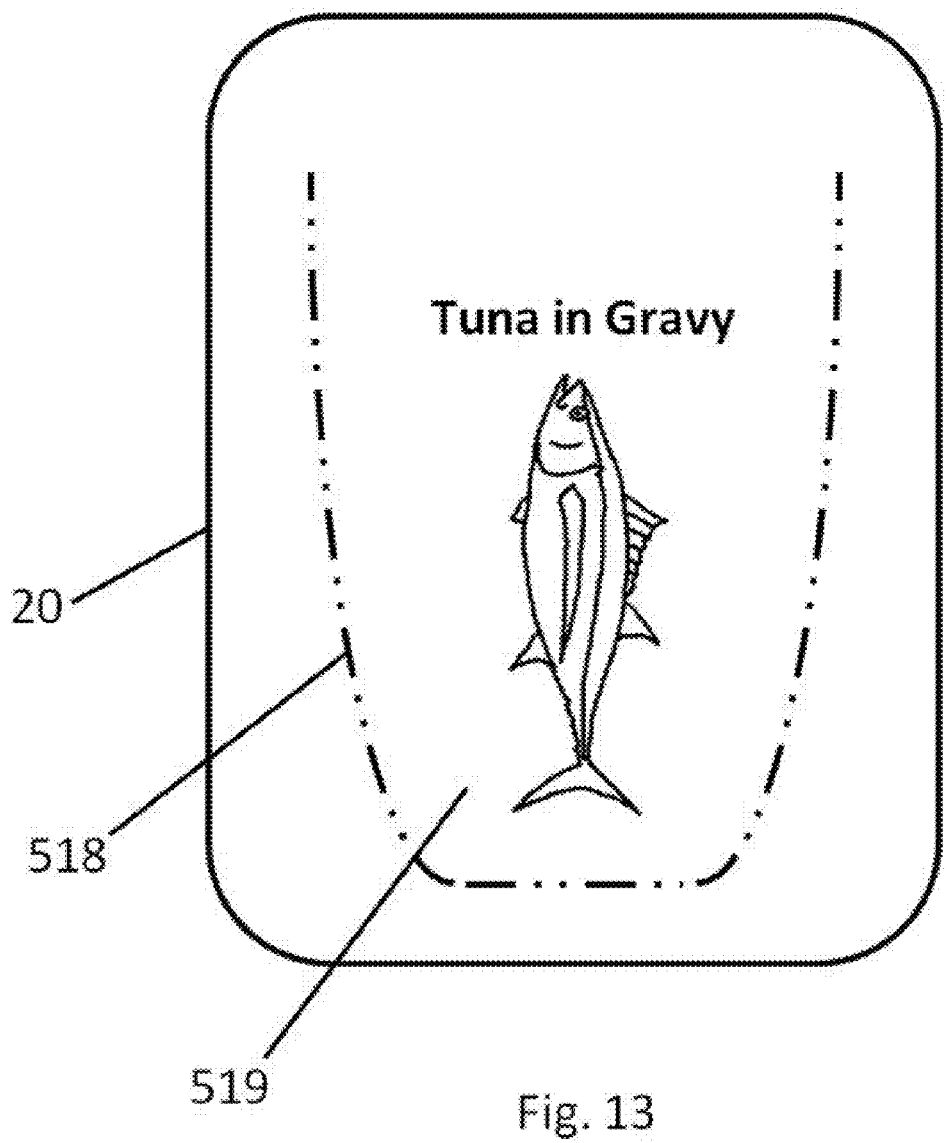
FIG. 13 is a front schematic view of the U-shaped cut in a wet pet food pouch produced by the rotary die cutting blade in FIG. 12.

Another cutting mechanism is depicted in FIG. 12. Here, food dispenser 510 is substantially similar to food dispenser 10 with the exception of the cutting mechanism. Here, a roller 542 is rotationally disposed on cutting arm 540 and provided with a die cutting blade 550. Blade 550 is substantially U-shaped, having a substantially horizontal section 554 between two substantially vertical sections 552. (An inverted U-shape would be equally effective.) As roller 542 rolls over a food pouch 20 whilst pressing downward on the pouch, blade 550 forms a substantially U-shaped cut 518 in pouch 20 (see FIG. 13). This creates a flap 519 that allows the food inside the pouch to fall out yet neither detaches from the rest of pouch 20 nor falls into the trough.

One possible concern with automated multi-meal pet feeding is that, at mealtime, pets may be presented with both freshly dispensed food and previously dispensed food that was incompletely eaten and may have spoiled. Many pet owners do not wash their pet's food bowl between feedings, putting fresh wet food on top of the remnants of the previous meal. Pets routinely eat the fresh food and ignore the older food.

A second possible concern with the present invention might be that a hungry pet could get injured by encountering blade 50 or might interfere with food pouches 20 or arm 40. FIG. 3 shows optional cover (or "shield") 150 which attaches to the device through interleaved piano hinge knuckles 65 that are joined by a continuous pin (not shown). As an alternative to a cover, a blade guard for a pizza cutter type blade may be directly fastened to cutting arm 40. The blade guard (not shown) would encircle the entire circumference of the blade, except for the cutting edge of the blade that will encounter and penetrate the pouch. A similar blade guard might be employed if blade 50 was a fixed (non-rotating) blade, such as a mat knife blade.

Figure 11:
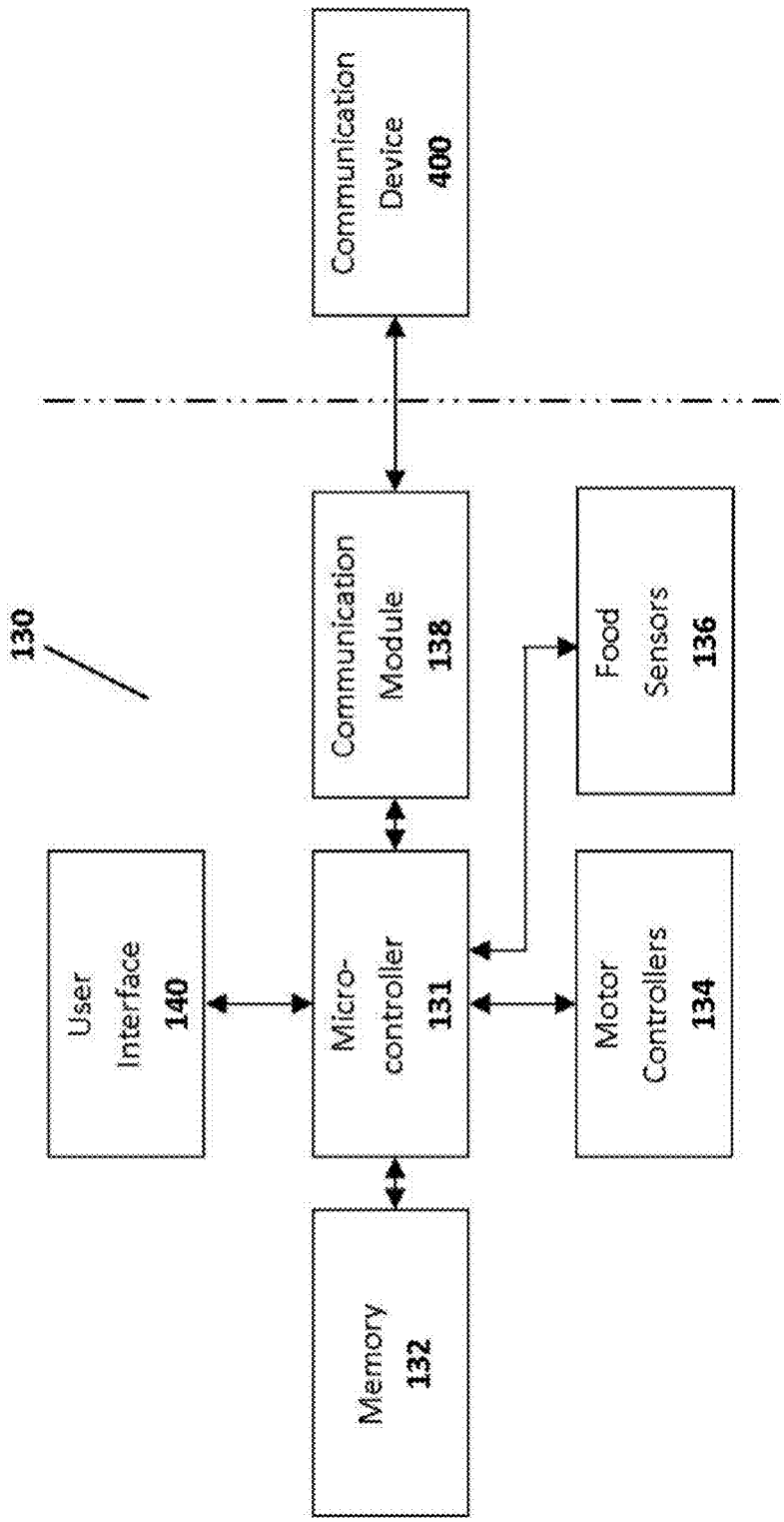
FIG. 11 is a schematic logic diagram of the interface, controller, and communications of a wet pet food dispenser in accordance with the invention.

Greater detail of the logic/timing module 130 is provided in connection with FIG. 11. Module 130 includes microcontroller 131 or similar computer control type device in communication with memory 132 and motor controller(s) 134. Memory 132 is used to store the various instructions input to the microcontroller by the user/pet owner via a user interface 140. User interface 140 can include a key pad, a touch screen, or any other known or to be developed interface adapted to receive instructions from a person and transmit them to microcontroller 131. Additionally, logic/timing module 130 may preferably include a communications module 138 that enables the microcontroller 131 to communicate with a user's communication device 400 (e.g., a smart phone, a smart watch, a computer, or the like), for reasons described below.

Food sensors 136 are provided to detect the presence or absence of food from trough/receptacle 90. While a momentary pushbutton switch located under each partition of a receptacle might be employed, it must be adapted not to give false positives. That is, the sensors must be able to distinguish between food falling into a receptacle partition and a pet putting its paw into the partition. As such, several options are available, preferably in conjunction with each other, to increase the accuracy of the sensing activity and reduce the chances of false detections. One such option is the use of an accelerometer or strain gauge or the like, set to detect the approximate weight of the contents of one pouch of food. Even the cleverest cat is not likely to be able to simulate the mass of a portion of wet food with its paw for any extended period of time (its potential inclination to do so notwithstanding). Another such option is the use of a moisture sensor in food trough 90. Since the food being deployed is wet food, its presence in the bowl can be detected when the liquid component of the food completes a circuit (of very low amperage). Another example includes a photoelectric sensor or "eye", which detects a break in a light (or other electromagnetic radiation) beam. This photodetector can be disposed on the base of the device to detect food falling therepast into the receptacle, or adjacent to the food receiving area of the receptacle, etc. A timing mechanism/circuit may be employed in conjunction with the photodetector to help the device distinguish the presence of food from the presence of a paw. In addition or in the alternative, a thermal sensor may be employed to distinguish room temperature food from the higher body temperature of a pet or child.

Regardless of which food sensing modalities are employed, food sensors 136 may be activated only at specific times during the process, e.g., when cutting arm 40 arrives at its expected position along channel 60 at the conclusion of the cutting process. The use of multiple events (food sensing, cutting blade placement, etc.) increases the accuracy of the food detection process and thus increases the pet owner's confidence that food has been dispensed.

At some time later, after food has been detected in the trough, food sensors may be employed again to detect the absence of food, i.e., that the pet successfully ate the food that fell into the trough. A moisture sensor may detect the presence or absence of the wet component of the food, while strain gauge or scale can detect the weight of the food remaining in the trough to provide a more granular picture to the user of how much the pet ate, if not all of the food.

Communication module 138 is provided to enable the device to communicate with a remote pet owner via the pet owner's communication device 400. This enables users to dispense food from a remote location by issuing a command (e.g., by phone call, email, text or other SMS message, social media message, or the like) from their smartphone or other PED. Such commands can be made in real time (e.g., "feed now") or take the form of a time or interval in the future (every day at 12:00 pm, every eight hours, etc.), to be programmed and stored in memory 132. Communication module 138 can also send messages to the pet owner, such as: the successful detection of food in the trough by food sensors 136; the subsequent successful eating of the food as the absence of food from the trough; any errors in operation (stuck blade, no food detected, etc.); or the like. Messages to the pet owner may take the form of an e-mail, a text or other SMS message, a prerecorded voice call, a social media update, or the like.

Some elements that may form part of, or all of, communication module 138 include: a Wi-Fi receiver, Ethernet jack, X10 controller, hard wire to a computer, or the like.

Logic/timing module 130 may include a microcontroller, a real time clock, a motor driver, an interface to the numeric keypad/display, and other circuitry that will be readily apparent to one of ordinary skill in the electrical arts. Logic/timing module 130 may provide a number of auxiliary functions, such as providing auditory feedback when keypad buttons are depressed, visual cues prompting parameter entry on the alphanumeric display, and a "low battery" warning.

In operation, the invention is used as follows. A pet owner ensures that the device is properly powered (e.g., by 120/220 VAC line, batteries, photovoltaic cells, etc.), opens cover 150, and loads the device with food pouches 20 secured by clips 30 and/or 120. The user closes cover 150 and provides commands (either via user interface 140 or via his/her communication device 400) to the logic/timing module. In response to commands so entered, circuitry contained in logic/timing module 130 sends, at the appropriate times, suitable signals via motor controllers 134 to servo motor 170 and vibrator motor 100 or tapping mechanism 116. A food pouch 20 is cut open, either partially or completely, and the pouch is shaken/vibrated to encourage the food to fall out. In addition or in the alternative, pet toys 117A-D (or others like them) are optionally deployed to get the pet's attention, encourage the pet to approach the dispenser and (with a suitable cover or blade guard) strike the newly cut pouch to shake food loose from it. Food sensors 136 detect (or fail to detect) the presence of food in trough 90, and an appropriate message is preferably sent to the pet owner's communication device 400, email inbox, or social media account via communication module 138. Subsequently, after a substantial portion of the food has been consumed, or a significant amount of time has passed, food sensors 136 will detect (or will fail to detect) a smaller quantity of food in trough 90 and send a confirmatory message to the pet owner's communication device 400, email inbox, or social media account to confirm that a quantity of food has been eaten.

Figure 14:
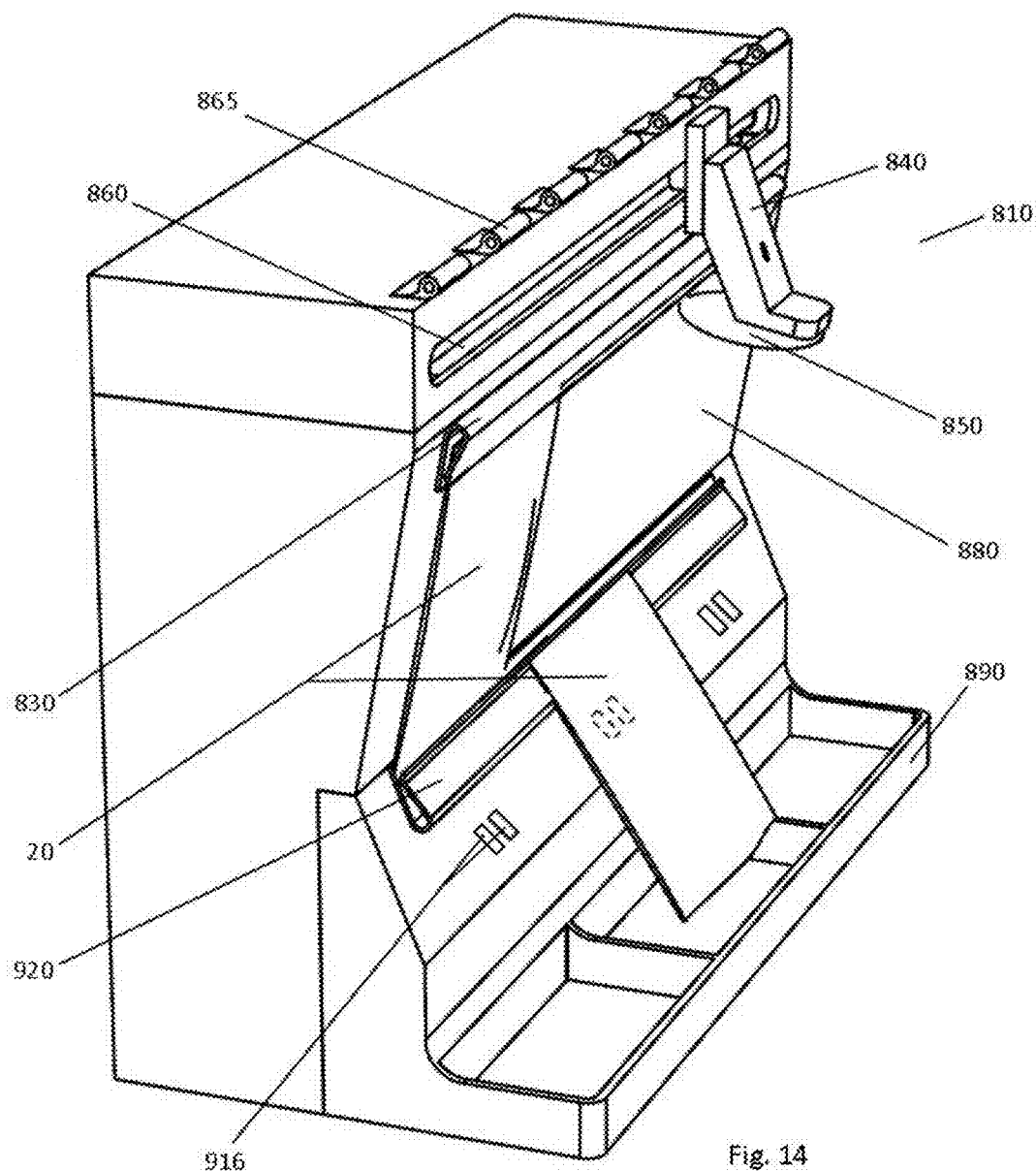
FIG. 14 is a perspective view of another linear embodiment of an automatic wet pet food dispenser in accordance with the invention.

FIG. 14 depicts a second linear embodiment of an automatic wet pet food dispenser 810, respectively, on which a number of flexible food containers such as food pouches 20 have been secured. Unlike dispenser 10, in dispenser 810, pouches 20 are secured to the device in an upright position (i.e., with the pouch edge to be severed closer to the ceiling) by upper clip 830 and lower clip 920. The clips, as above, may be, e.g., a spring-loaded clip, a captive screw-tensioned bar, or a slot cut in front wall 880, tapered in the direction of travel of arm 840. Front wall 880 is angled at an acute angle to the floor, i.e., 90° or smaller, so that the pouch will flop down and spill its contents into receptacle 890 (or the like) after being cut by blade 850 on arm 840. As above, cutting arm 840 is connected through channel 860 to a belt-drive assembly (not shown). The belt-drive assembly induces arm 840 to travel parallel to front wall 880 which causes blade 850 to sever an edge of one or more food pouches. An optional cover (not shown) may be provided which attaches to the device through, e.g., interleaved piano hinge knuckles 865 that are joined by a continuous pin (not shown). A tapping/poking mechanism 916 may be provided integral with and periodically poking in and out of dispenser 810 to poke or tap pouch 20 after the cutting process and after the pouch has flopped downward (as shown in the "middle" position in FIG. 14). The tapping/poking mechanism 916 shown in FIG. 14 includes two prongs per pouch area, however any convenient number of prongs in any arrangement may be provided. In all other respects, dispenser 810 is substantially similar to dispenser 10.

Figure 8:
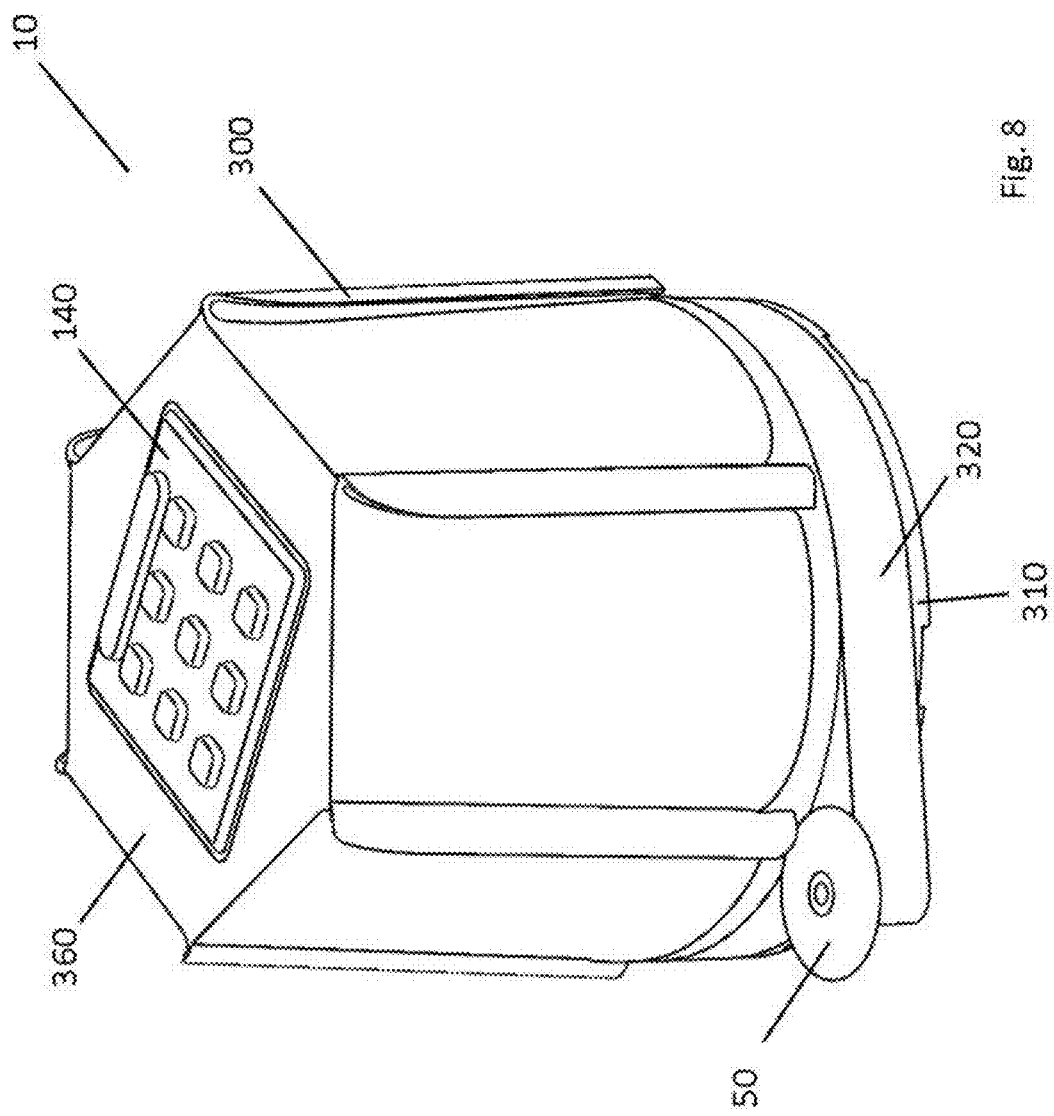
FIG. 8 is a perspective view of a rotary embodiment of an automatic wet pet food dispenser in accordance with the invention before food pouches have been fastened to the device.
Figure 9:
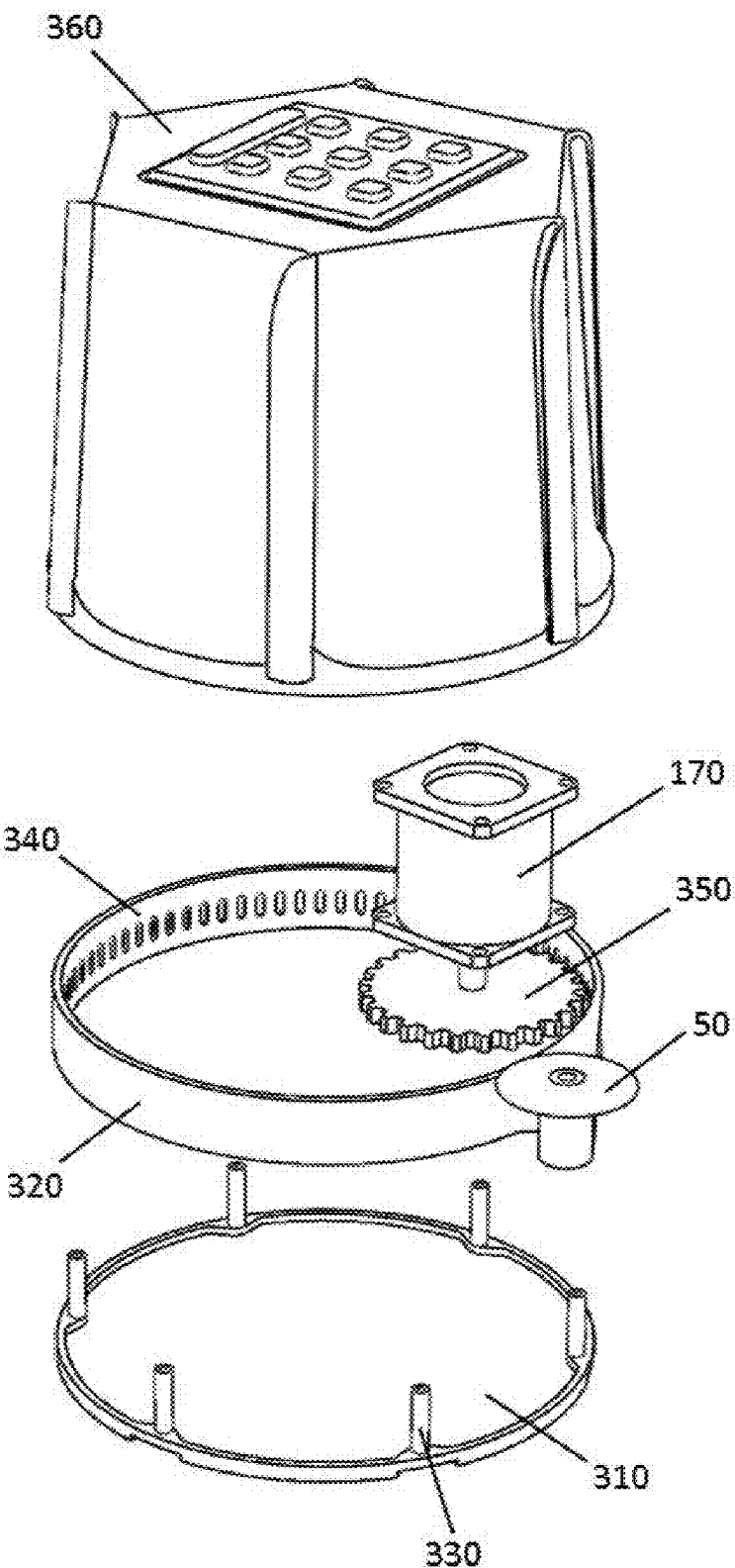
FIG. 9 is an exploded perspective view of a rotary embodiment of an automatic wet pet food dispenser in accordance with the invention, highlighting the assembly that drives the geared blade mount around the periphery of the device and the connections between this drive assembly and base 310 and pouch holder 360.
Figure 10:
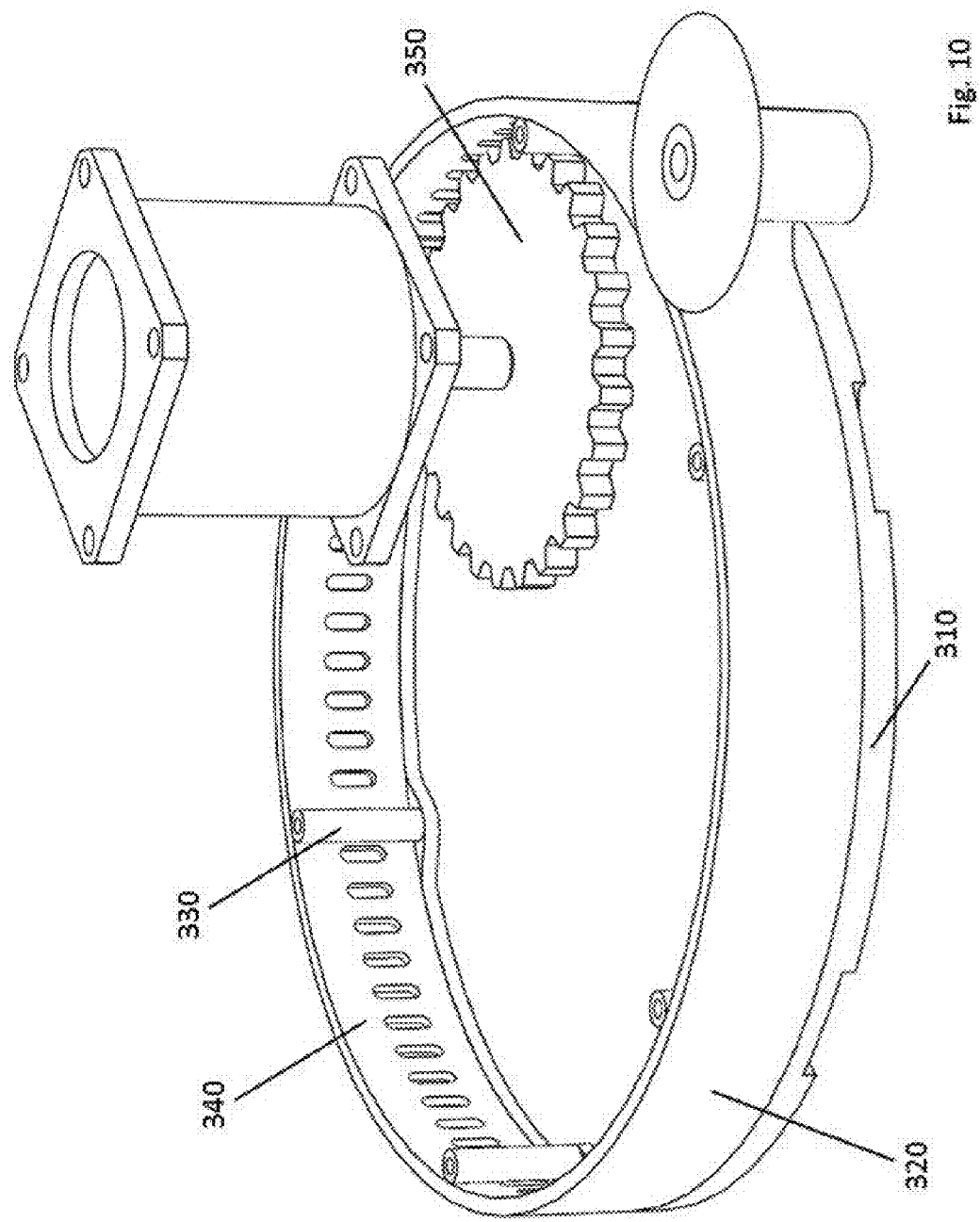
FIG. 10 is a perspective view of the assembly that drives the geared blade mount in a rotary embodiment of an automatic wet pet food dispenser in accordance with the invention.

Description of a rotary embodiment of the invention will now be given with reference to attached FIGS. 8-10. This description will only focus on the relatively small differences between the linear and rotary embodiments. Logic/Timing module 130, which is substantially identical to the module in the linear embodiments of the invention, is not shown in these figures. It may be situated in any convenient location within pouch holder 360. The logic/timing module induces the shaft of servo motor 170 to rotate by an amount appropriate to cause blade 50 to sever the edge of a single food pouch. Spur gear 350 is rigidly attached to the shaft of servo motor 170 and is situated so as to mesh with internal gear 340 of geared blade mount 320 so that rotation of the spur gear results in rotation of the geared blade mount in the opposite direction. Blade 50 is affixed to the arm of the geared blade mount such that the cutting edge of the blade contacts and travels along the cutting surface of pouch carrier 360, encountering and severing the bottom edge a food pouch in a similar fashion to the linear embodiment of this invention. Not shown in FIGS. 8-10 are a number of optional elements whose structure and function readily carry over from the linear embodiment, including, among others, feeder cover 150, trough 90, and cutting surface 70.

The invention is not limited to the above description. For example, the number of food pouches that the linear embodiments of the invention will accommodate on front wall 80 can be changed to any convenient number. One can also double the number of pouches that the linear embodiments of the invention could accommodate, by mirroring the invention along the plane of the back face of the invention (i.e., essentially two copies of the invention are placed back-to-back and then fastened together). User controls 140 would be appropriately relocated in such an embodiment. As another option, for families that have more than one pet, more than one food pouch may be openable at the same time to allow multiple animals to eat.

Having described certain embodiments of the invention, it should be understood that the invention is not limited to the above description or the attached exemplary drawings. Rather, the scope of the invention is defined by the claims appearing hereinbelow and includes any equivalents thereof as would be appreciated by one of ordinary skill in the art.

What is claimed is:

1. A method of automatically feeding wet food to a pet, comprising the steps of:
    a) providing a pre-measured quantity of wet pet food in a sealed container;
    b) securing a bottom edge of the container in a fixed location against a fixed cutting surface angled at an angle of 90° or smaller to the floor in a wet food dispenser above a food receptacle;
    c) automatically cutting open a top edge of the container at least partially by pressing a movable cutting blade along a predetermined cutting path at or near the top edge of the container against the container against the cutting surface; and
    d) allowing the pet food in the container to fall out of the container into the food receptacle via gravity because of the cutting surface angle of 90° or smaller.

2. A method of automatically feeding wet food to a pet according to claim 1, further comprising the step of e) shaking the container after said automatic cutting step c) to facilitate said allowing-to-fall step d) via imparting periodic movement to the container while the container is in the fixed location on the cutting surface via a tapping mechanism.

3. A method of automatically feeding wet food to a pet according to claim 1, said automatic cutting step c) further comprising the step of receiving an instruction to initiate said cutting step at a predeterminable time.

4. A method of automatically feeding wet food to a pet according to claim 3, said receiving step further comprising the step of receiving an instruction remotely from a pet owner's communication device.

5. A method of automatically feeding wet food to a pet according to claim 3, said receiving step further comprising the steps of:
    entering a predetermined feeding time on a user interface; and
    storing the predetermined feeding time in a memory.

6. A method of automatically feeding wet food to a pet according to claim 1, further comprising the step of, after said cutting step, detecting the presence of wet food from the opened container in the food receptacle.

7. A method of automatically feeding wet food to a pet according to claim 6, said detecting step further comprising the step of detecting at least one of i) the weight of the food in the receptacle, or ii) the moisture of the food in the receptacle.

8. A method of automatically feeding wet food to a pet according to claim 6, further comprising the step of sending a first message to the pet owner corresponding to the food detected in said detecting step.

9. A method of automatically feeding wet food to a pet according to claim 8, further comprising the steps of:
    detecting that food has been substantially eaten from the food receptacle; and
    sending a second message to the pet owner corresponding to the eating of the food from the receptacle.

10. A method of automatically feeding wet food to a pet according to claim 1, said cutting step c) further comprising the step of moving a cutting blade across the tearing edge of the container.

11. A method of automatically feeding wet food to a pet according to claim 10, said moving step further comprising the steps of:

providing a motor and mechanical linkage between the motor and the cutting blade; and actuating the motor.

12. An automatic wet pet food dispenser, comprising:
a fixed cutting surface angled at an angle of 90° or smaller to the floor and having a lower retaining clip adapted to secure a bottom edge of at least one sealed container of wet pet food fixedly against said cutting surface;
a movable cutting blade selectively contactable with, pressable against, and movable with respect to the container secured on said cutting surface along a predetermined cutting path to thereby cut open a top edge of the container at least partially by pressing said blade against the container against said cutting surface; and
a motor moving said movable cutting blade across the container up against said cutting surface,
wherein because of said angle of 90° or smaller, after said cutting blade cuts along at or near the top edge of the container, the container pivots away from said cutting surface about the secured bottom edge and the wet pet food inside the container substantially falls out.

13. An automatic wet pet food dispenser according to claim 12, further comprising at least one food receptacle disposed below said cutting surface adapted to receive the wet pet food substantially falling out of the container when said cutting blade at least partially cuts open the container.

14. An automatic wet pet food dispenser according to claim 12, further comprising:
a container-shaking mechanism associated with said cutting surface and contactable with the container fixedly placed thereon adapted to shake the fixedly placed container to facilitate the wet pet food falling out of the container without moving the fixedly placed container from said cutting surface.

15. An automatic wet pet food dispenser according to claim 14, said container shaking mechanism further comprising a tapping mechanism reciprocatable into and out of said cutting surface to tap the fixedly placed container periodically.

16. An automatic wet pet food dispenser according to claim 12, said movable cutting blade further comprising a linkage that drags said movable cutting blade across the tearing edge of the container up against said cutting surface to form a substantially straight cut in the container.

17. An automatic wet pet food dispenser according to claim 12, further comprising:
a user interface adapted to receive instructions from a user to program operation of said motor;
a logic/timing module, in communication with said user interface and said motor, adapted to receive said instructions from said user interface and transmit said instructions to said motor.

18. An automatic wet pet food dispenser according to claim 17, said logic/timing module further comprising a microcontroller in communication with said user interface and said motor and memory in communication with said microcontroller for storing said instructions.

19. An automatic wet pet food dispenser according to claim 18, said logic/timing module further comprising a communication module, in communication with said microcontroller, adapted to at least one of i) send messages to a user's remote communication device, and ii) receive messages from a user's remote communication device.

20. An automatic wet pet food dispenser according to claim 19, further comprising at least one food sensor in communication with said logic/timing module and a food receptacle adapted to detect the presence of wet pet food in said food receptacle.

21. An automatic wet pet food dispenser according to claim 20, said at least one food sensor further comprising at least one of an accelerometer or a strain gauge.

22. An automatic wet pet food dispenser, comprising:
a fixed cutting surface onto which at least one sealed container of pet food is securable; and
a cutting blade selectively movable along a predefined path on the cutting surface in such a way that, when a container is thus secured, the cutting blade at least partially cuts open the container at a cutting location on the container,
wherein said cutting location is such that at least a portion of the pet food in such a container thus secured will flow out of the container solely under the influence of gravity as a direct result of the container being at least partially cut open by said cutting blade; and
wherein the container is a non-rigid pouch having a top edge and bottom edge; and
wherein said dispenser further comprises a first securer that secures the top edge of the container to said fixed cutting surface and a second securer that secures the bottom edge of the container to said fixed cutting surface; and
wherein said cutting location is at or near the top edge of the container; and
wherein said predetermined path is such that the container is completely cut open by movement of said cutting blade and as a result of which the top edge is no longer secured by said first securer, and
wherein when the top edge is no longer secured by said first securer, the container will, solely under the influence of gravity, pivot around the second securer and flop over.

23. An automatic wet pet food dispenser according to claim 22, wherein said cutting location is such that pet food in a container thus secured will flow out of the container without the dispenser actively changing the orientation of the container.

* * * * *